US009374010B2

(12) United States Patent
Shen et al.

(10) Patent No.: US 9,374,010 B2
(45) Date of Patent: Jun. 21, 2016

(54) POWER ADAPTOR

(71) Applicants: Yu-Cheng Shen, Taipei (TW); Yu Hung, Taipei (TW)

(72) Inventors: Yu-Cheng Shen, Taipei (TW); Yu Hung, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 566 days.

(21) Appl. No.: 13/945,878

(22) Filed: Jul. 18, 2013

(65) Prior Publication Data

US 2014/0313782 A1   Oct. 23, 2014

(30) Foreign Application Priority Data

Apr. 18, 2013   (TW) .............................. 102113810 A

(51) Int. Cl.
*H02M 3/335* (2006.01)
*H02M 7/02* (2006.01)
*H02M 1/00* (2006.01)

(52) U.S. Cl.
CPC .. *H02M 3/33507* (2013.01); *H02M 2001/0032* (2013.01); *Y02B 70/16* (2013.01)

(58) Field of Classification Search
CPC .......... H02M 2001/0032; H02M 1/00; H02M 3/335; H02M 3/33507; H02M 1/36; H02M 7/02; Y02B 70/16; H02J 9/005; H02J 2009/007
See application file for complete search history.

(56) References Cited

U.S. PATENT DOCUMENTS

| 8,259,482 | B2 | 9/2012 | Wang et al. | |
|---|---|---|---|---|
| 2008/0247203 | A1* | 10/2008 | Cassidy | H02M 3/335 363/84 |
| 2009/0189582 | A1* | 7/2009 | Watanabe | H02M 1/32 323/282 |
| 2010/0202161 | A1* | 8/2010 | Sims | H02M 7/02 363/20 |
| 2011/0157939 | A1 | 6/2011 | Wang et al. | |
| 2015/0349651 | A1* | 12/2015 | Morota | H02M 3/33523 363/21.15 |

FOREIGN PATENT DOCUMENTS

| CN | 202034889 | 11/2011 |
|---|---|---|
| TW | 201033796 | 9/2010 |
| TW | M403687 | 5/2011 |
| TW | I358189 | 2/2012 |

* cited by examiner

*Primary Examiner* — Timothy J Dole
*Assistant Examiner* — Ivan Laboy Andino
(74) *Attorney, Agent, or Firm* — Jianq Chyun IP Office

(57) ABSTRACT

A power adaptor is provided. The power adaptor includes a voltage converter, a connecting port, a first transformer and a controller. The voltage converter receives an input voltage and determines whether to convert the input voltage to an output voltage according to an indicating signal. The first transformer includes a primary side and a secondary side. The primary side and the secondary side are coupled to each other, and a first end and a second end of the secondary side are coupled to the connecting port, respectively. The controller generates the indicating signal according to a voltage at the primary side of the first transformer. The connecting port is used to connect to an electrical device, and when the connecting port is electrically connected to the electrical device, a first end and a second end of the secondary side are short to a reference ground end of the secondary side.

13 Claims, 3 Drawing Sheets

POWER ADAPTOR

CROSS-REFERENCE TO RELATED APPLICATION

This application claims the priority benefit of Taiwan application serial No. 102113810, filed on Apr. 18, 2013. The entirety of the above-mentioned patent application is hereby incorporated by reference herein and made a part of specification.

BACKGROUND OF THE INVENTION

1. Field of the Invention

The invention relates to a power adapter and, more particularly, to a power adapter which can stop providing an output voltage in time.

2. Description of the Related Art

As a portable electronic device is widely used nowadays, a power adapter for providing power is also widely used. When the power adapter is not connected to the electronic device, the power consumption of the power adapter should be taken into account.

Moreover, if the power adapter continuously outputs a voltage when it is not connected to a load, when the power adapter is connected to the electronic device, current density may increase due to the small contact area of connectors and sparkle affection may generate. The sparkle affection may hurt the user and damage the connector.

In conventional technology, an electronic device as a load can transmit a signal to the power adapter to indicate different working states (such as booting, standby, sleep or normal operation states) of the electronic device connected to power adapter. However, the power adapter should cooperate with the electronic device which can provide the indicating signal, and the power adapter only gets the working state of the electronic device, which does not include a connecting state of the electronic device and the power adapter.

BRIEF SUMMARY OF THE INVENTION

A power adapter which can determine whether to generate an output voltage according to a load state is provided.

A power adapter includes a voltage converter, a connecting port, a first transformer and a controller. The voltage converter receives an input voltage and determines whether to convert the input voltage to an output voltage according to an indicating signal. The connecting port is connected to an electronic device. The first transformer includes a primary side and a secondary side. The primary side and the secondary side are coupled to each other, and a first end and a second end of the secondary side are coupled to the connecting port, respectively. The controller is coupled to the voltage converter and the first transformer. The controller generates the indicating signal according to a voltage at the primary side of the first transformer. When the connecting port is electrically connected to the electronic device, a first end and a second end of the secondary side are short to a reference ground end.

The power adapter includes the first transformer, and the secondary side of the first transformer is connected to the connecting port. A voltage change between two ends of the secondary side of the first transformer is coupled to the primary side of the first transformer. Thus, the power adapter can know whether the connecting port is connected to the electronic device via the voltage change at the primary side of the first transformer, and determines whether to generate an output voltage accordingly. When the electronic device is not connected to the power adapter, the power adapter does not generate the output voltage to save power consumption.

These and other features, aspects and advantages of the present invention will become better understood with regard to the following description, appended claims, and accompanying drawings.

DETAILED DESCRIPTION OF THE EMBODIMENTS

Figure 1:
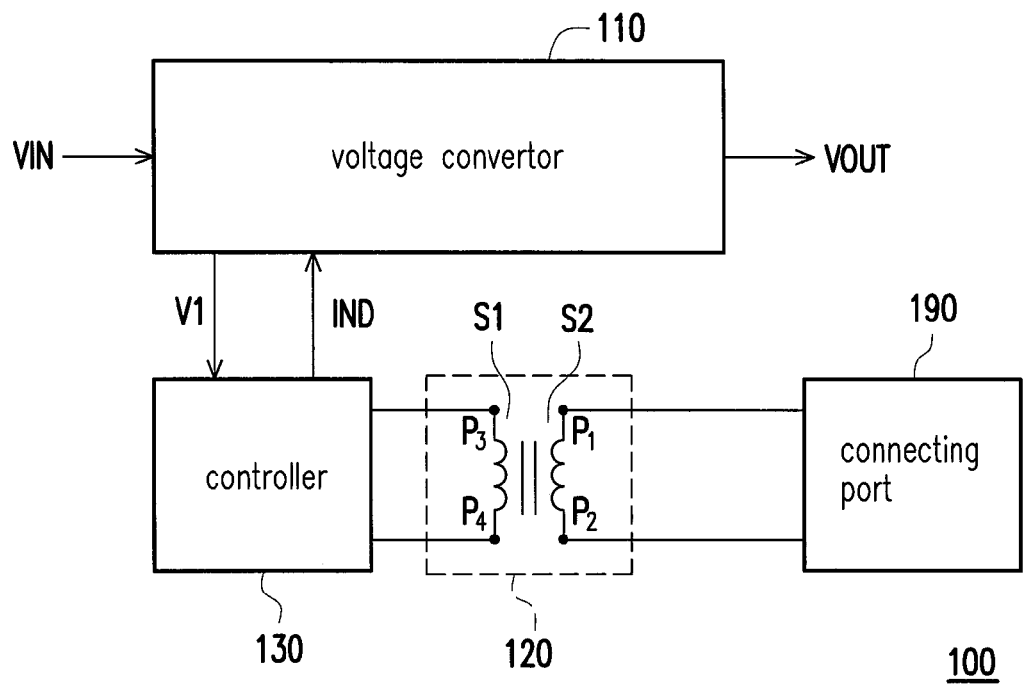
FIG. 1 is a schematic diagram showing a power adapter in an embodiment.

FIG. 1 is a schematic diagram showing a power adapter 100 in an embodiment. The power adapter 100 includes a voltage converter 110, a first transformer 120, a controller 130 and a connecting port 190. The voltage converter 110 receives an input voltage VIN. The voltage converter 110 receives an indicating signal IND and determines whether to convert the input voltage VIN to an output voltage VOUT according to the indicating signal IND. The input voltage VIN may be an alternative current (AC) voltage, and the output voltage VOUT may be a direct current (DC) voltage.

The controller 130 is coupled to the voltage converter 110 and the first transformer 120. The first transformer 120 includes a primary side S1 and a secondary side S2. Two ends $P_3$ and $P_4$ of the primary side S1 of the first transformer 120 are coupled to the controller 130, and two ends $P_1$ and $P_2$ of the secondary side S2 of the first transformer 120 are coupled to the connecting port 190.

The voltage difference between the two ends $P_3$ and $P_4$ of the primary side S1 of the first transformer 120 is coupled to the voltage difference between the two ends $P_1$ and $P_2$ of the secondary side S2 of the first transformer 120. That is, when the voltage difference between the two ends $P_3$ and $P_4$ of the primary side S1 of the first transformer 120 changes, the voltage difference between the two ends $P_1$ and $P_2$ of the secondary side S2 of the first transformer 120 is affected. Similarly, when the voltage difference between the two ends $P_1$ and $P_2$ of the secondary side S2 of the first transformer 120 changes, the voltage difference between the two ends $P_3$ and $P_4$ of the primary side S1 of the first transformer 120 is also affected.

When the connecting port 190 of the power adapter 100 is connected to the electronic device, the ends $P_1$ and $P_2$ are short to a reference ground end of the secondary side, and the voltage difference between the ends $P_1$ and $P_2$ is 0V. The voltage difference between the two ends $P_3$ and $P_4$ of the primary side S1 of the first transformer 120 is correspondingly pulled to 0V via the coupling between the primary side S1 and the secondary side S2 of the first transformer 120. At the same time, the controller 130 detects a voltage difference change between the two ends $P_3$ and $P_4$ of the primary side S1 of the first transformer 120, and sends out the indicating signal IND accordingly to inform the voltage converter 110. Then, the voltage converter 110 converts the input voltage VIN to the output voltage VOUT.

When the connecting port 190 of the power adapter 100 is not connected to the electronic device, the two ends $P_1$ and $P_2$ of the secondary side S2 of the first transformer 120 are separated from each other, and at least one of the ends $P_1$ and $P_2$ is floating and has no voltage. Thus, the voltage difference between the two ends $P_3$ and $P_4$ of the primary side S1 of the first transformer 120 would not be clamped to 0V. The ends $P_3$ and $P_4$ act as an inductance element with respect to the controller 130, and the controller 130 generates the indicating signal IND correspondingly to control the voltage converter 110 not to convert the input voltage VIN to the output voltage VOUT.

As stated above, the power adapter 100 gets whether the connecting port 190 is electrically connected to the electronic device by detecting the voltage change at the primary side S1 of the first transformer 120, and controls the voltage converting operation of the voltage converter 110 correspondingly. Thus, when the power adapter 100 is not connected to the electronic device, even though the input voltage VIN is continuously provided to the power adapter 100, the power adapter 100 does not waste power due to the useless voltage conversion. Furthermore, since the output voltage VOUT is not generated, when the power adapter 100 is connected to the electronic device, there would be no sparkle affection.

Furthermore, the controller 130 receives the voltage V1 from the voltage converter 110 to use the voltage as an operation power. Thus, the controller 130 does not need an additional voltage as the operation power.

Figure 2:
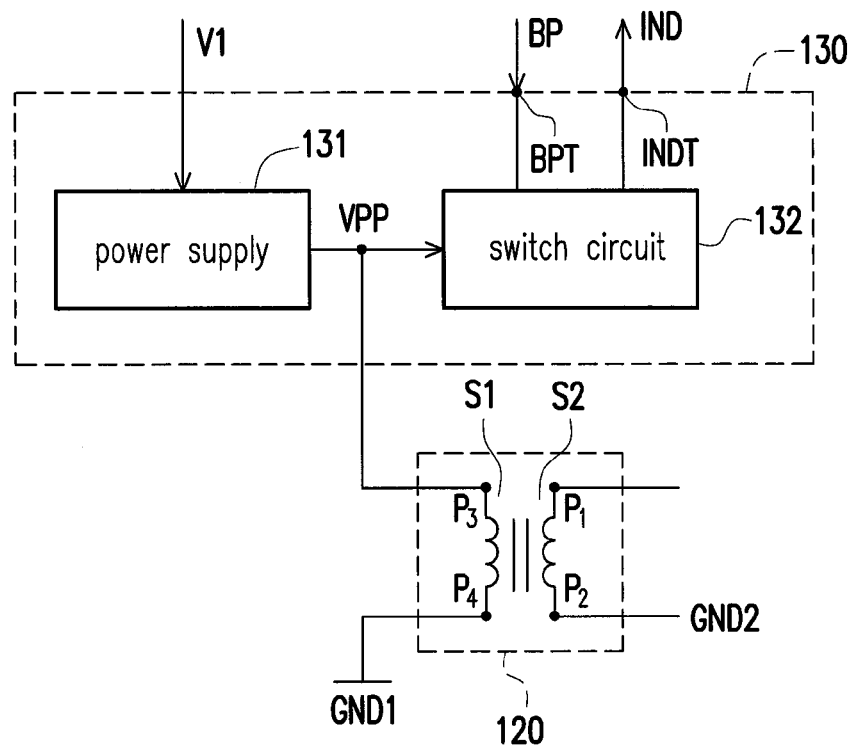
FIG. 2 is a schematic diagram showing a controller in an embodiment.

FIG. 2 is a schematic diagram showing a controller 130 in an embodiment. Please refer to FIG. 1 and FIG. 2, the controller 130 includes a power supply 131, a switch circuit 132, a redundant voltage receiving end BPT and an indicating signal generating end INDT. The power supply 131 is coupled to the voltage converter 110 to receive the voltage V1 generated according to the input voltage VIN, and the voltage V1 can be used as an operation power for the power supply 131. When the connecting port 190 is not connected to the electronic device, the power supply 131 utilizes the voltage V1 and the inductance feature of the primary side S1 of the first transformer 120 to generate a supply power VPP with pulses, and the supply power VPP has a changeable voltage level. The supply power VPP is provided to the switch circuit 132 and the end $P_4$ of the primary side S1 of the first transformer 120 is coupled to the reference ground end GND1 of the primary side.

The switch circuit 132 is coupled to the redundant voltage receiving end BPT and the indicating signal generating end INDT. The switch circuit 132 determines whether to connect the redundant voltage receiving end BPT and the indicating signal generating end INDT according to the power state of the supply power VPP. When the ends $P_1$ and $P_2$ of the secondary side S2 of the first transformer 120 are not connected, the pulse voltage of the supply power VPP controls the switch circuit 132 to intermittently connect the redundant voltage receiving end BPT and the indicating signal generating end INDT. Thus, the voltage level of the indicating signal IND is maintained at a value close to the voltage of the redundant voltage BP. Relatively, when the ends $P_1$ and $P_2$ of the secondary side S2 of the first transformer 120 are short to the reference ground end GND2 of the secondary side, the voltage of the supply power VPP is pulled to 0V, and the switch circuit 132 cuts the connection of the redundant voltage receiving end BPT and the indicating signal generating end INDT. Thus, the voltage level of the indicating signal IND decreases and equals to the voltage level of the reference ground end GND1 of the primary side due to the power consumption of resistances in the switch circuit 132.

As stated above, the voltage converter 110 gets whether the connecting port 190 is connected to a load by detecting the voltage level of the indicating signal IND, and determines whether to convert the voltage and generate the output voltage VOUT according to the connection state.

The redundant voltage BP may be provided by the voltage converter 110. The redundant voltage BP and the voltage V1 may be the same.

Figure 3:
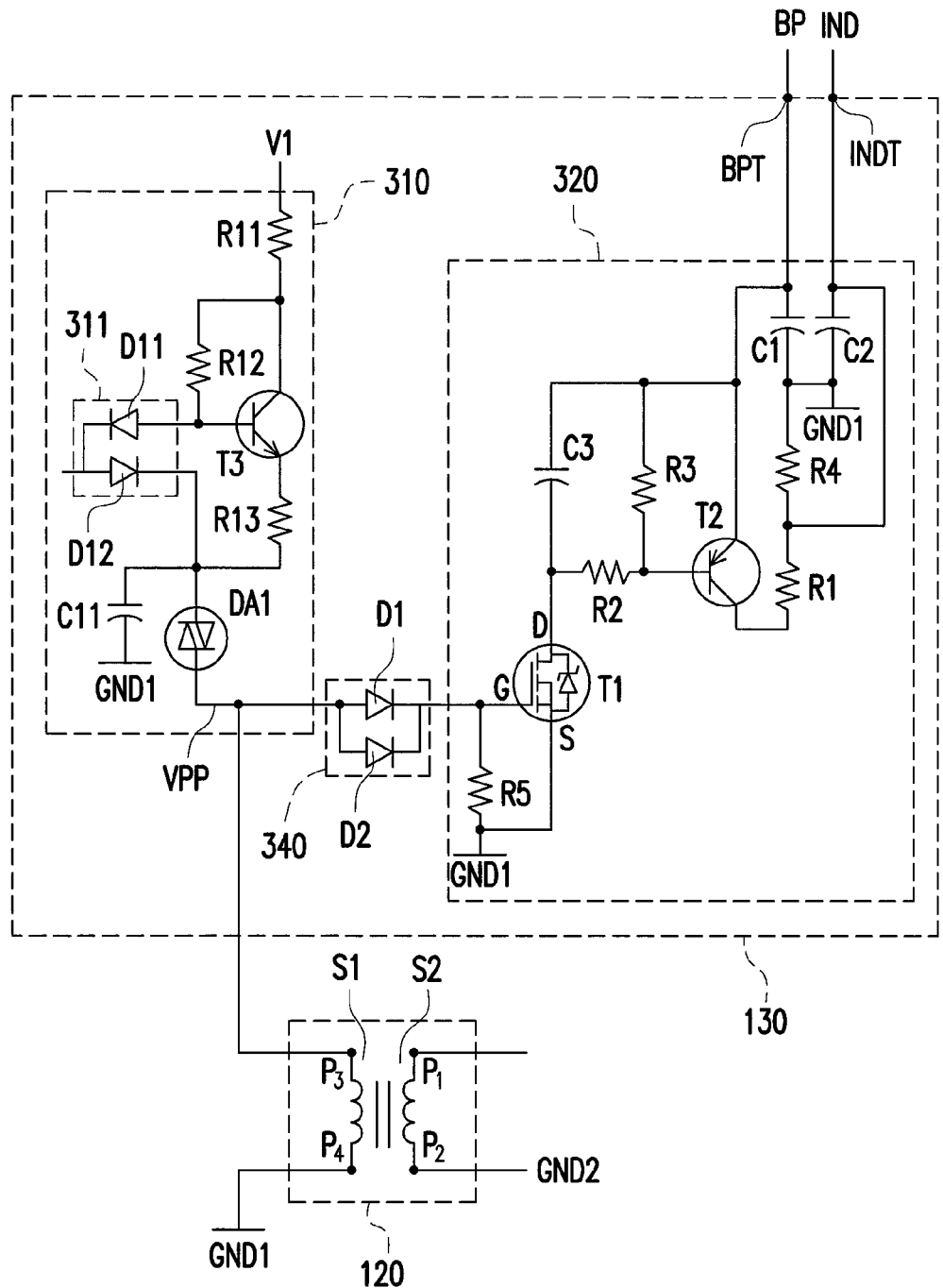
FIG. 3 is a schematic diagram showing a controller in another embodiment.

FIG. 3 is a schematic diagram showing a controller 130 in another embodiment. The controller 130 includes a power supply 310, a switch circuit 320, a redundant voltage receiving end BPT and an indicating signal generating end INDT. The power supply 310 includes resistances R11, R12 and R13, a transistor T3, a capacitor C11, an AC diode DA1 and a pair of diodes 311. The first end of the resistance R11 is coupled to the voltage converter 110 to receive the voltage V1 generated according to the input voltage VIN, and the second end of the resistance R11 is coupled to the first end of the transistor T3. The first end of the resistance R12 is coupled to the second end of the resistance R11, and the second end of the resistance R12 is coupled to the control end of the transistor T3. The second end of the transistor T3 is coupled to the first end of the resistance R13, and the second end of the resistance R13 is coupled to the first end of the AC diode DA1. Moreover, a pair of diodes 311 is coupled between the control end of the transistor T3 and the second end of the resistance R13. The anode of the diode D11 of the diodes 311 is coupled to the control end of the transistor T3, the cathode of the diode D12 is coupled to the second end of the resistance R13, and the cathode of the diode D11 is coupled to the anode of the diode D12. The capacitor C11 is coupled between the second end of the resistance R13 and the reference ground end GND1 of the primary side.

The second end of the AC diode DA1 generates the supply power VPP to a rectifier 340. The rectifier 340 is coupled between the switch circuit 320 and the first transformer 120.

In the embodiment, the rectifier 340 includes at least one diode D1 and one diode D2. The diode D1 is parallel connected to the diode D2, the anode of the diodes D1 and D2 is coupled to the AC diode DA1, and the cathode of the diodes D1 and D2 is coupled to the control end of the transistor T1.

The switch circuit 320 includes transistors T1 and T2, resistances R1 to R5 and capacitors C1 to C3. The second end of the transistor T1 is coupled to the reference ground end GND1 of the primary side, and the control end of the transistor T1 is coupled to the catnodes of the diodes D1 and D2 of the rectifier 340. The first end of the transistor T2 is coupled to the redundant voltage receiving end BPT. The resistance R1 is connected in series between the second end of the transistor T2 and the indicating signal generating end INDT. The resistance R2 is connected in series between the first end of the transistor T1 and the control end of the transistor T2. The resistance R3 is connected in series between the first end and the control end of the transistor T2. The resistance R4 is connected in series between the reference ground end GND1 and the indicating signal generating end INDT. The resistance R5 is connected in series between the control end of the transistor T1 and the reference ground end GND1 of the primary side. One ends of the capacitors C1 and C2 are coupled to the reference ground end GND1, respectively, and the other end of the capacitor C1 is coupled to the redundant voltage receiving end BPT, and the other end of the capacitor C2 is coupled to the indicating signal generating end INDT. The capacitor C3 is connected in series between the first end of the transistor T1 and the redundant voltage receiving end BPT.

When the ends $P_1$ and $P_2$ of the secondary side S2 of the first transformer 120 are not connected, the supply power VPP is a voltage with pulses. The supply power VPP can make the transistor T1 conducted periodically via the rectifier 340, and the voltage of the control end of the transistor T2 maintains at a voltage level close to the voltage of the reference ground end GND1 (such as an 0V ground voltage) of the primary side. Thus, the transistor T2 is conducted, and the redundant voltage receiving end BPT is periodically connected to the indicating signal generating end INDT via the resistance R1. Via the voltage stabilizing of the capacitor C2, the voltage level of the indicating signal IND transmitted by the indicating signal generating end INDT is maintained at a voltage close to the voltage level of the redundant voltage BP.

When the ends $P_1$ and $P_2$ of the secondary side S2 of the first transformer 120 are short to the reference ground end GND2 of the secondary side, the voltage of the supply power VPP is pulled to the voltage the reference ground end GND1 of the primary side. Thus, both the transistor T1 and the transistor T2 cannot be conducted, and the connection between the redundant voltage receiving end BPT and the indicating signal generating end INDT is cut. Due to the power consumption of the resistance R4, the voltage level of the indicating signal IND transmitted by the indicating signal generating end INDT is decreased to the voltage level of the reference ground end GND1 of the primary side.

In the embodiment, the transistors T2 and T3 are bipolar junction transistors, and the transistor T1 is a metal-oxide-semiconductor field effect transistor.

Figure 4:
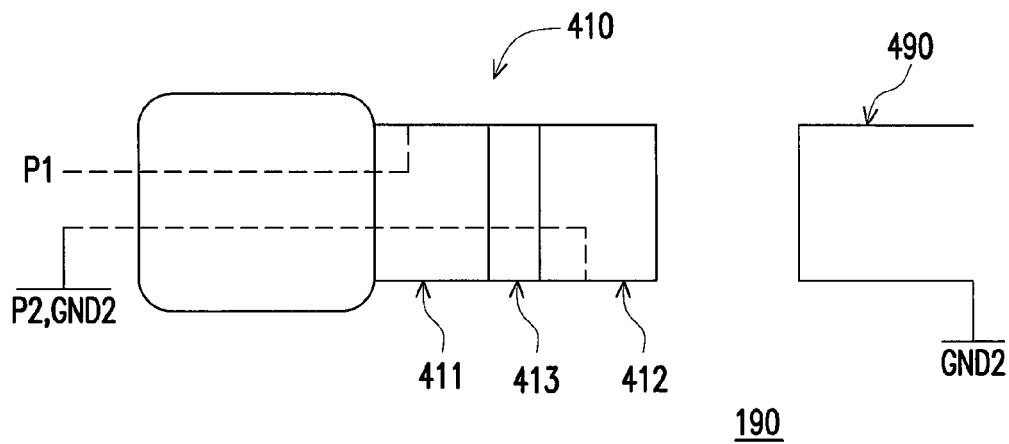
FIG. 4 is a schematic diagram showing a connecting port in an embodiment.

FIG. 4 is a schematic diagram showing a connecting port 190 in an embodiment. As shown in FIG. 4, the connecting port 190 includes a plug body 410, a first conducting part 411, a second conducting part 412 and an insulating part 413. The plug body 410 has a surface. The first conducting part 411 is located at the surface of the plug body 410, and the first conducting part is electrically connected to the end $P_1$ of the secondary side of the first transformer. The second conducting part 412 is located at the surface of the plug body 410, and the second conducting part 412 is electrically connected to the end $P_2$ and the reference ground end GND2 of the secondary side of the first transformer. The insulating part 413 is located at the surface of the plug body 410 and between the first conducting part 411 and the second conducting part 412 to insulate the first conducting part 411 and the second conducting part 412. The connecting port 190 also includes a central conducting part (not shown) coupled to the end of the power adaptor which generates the output voltage.

When the connecting port 190 is inserted to a connecting port 490 of the electronic device, a conducting part thereon which is connected to the reference ground end GND2 of the secondary side contacts and covers the first conducting part 411 and the second conducting part 412. Thus, the first conducting part 411 and the second conducting part 412 are short to the reference ground end GND2 of the secondary side.

Figure 5:
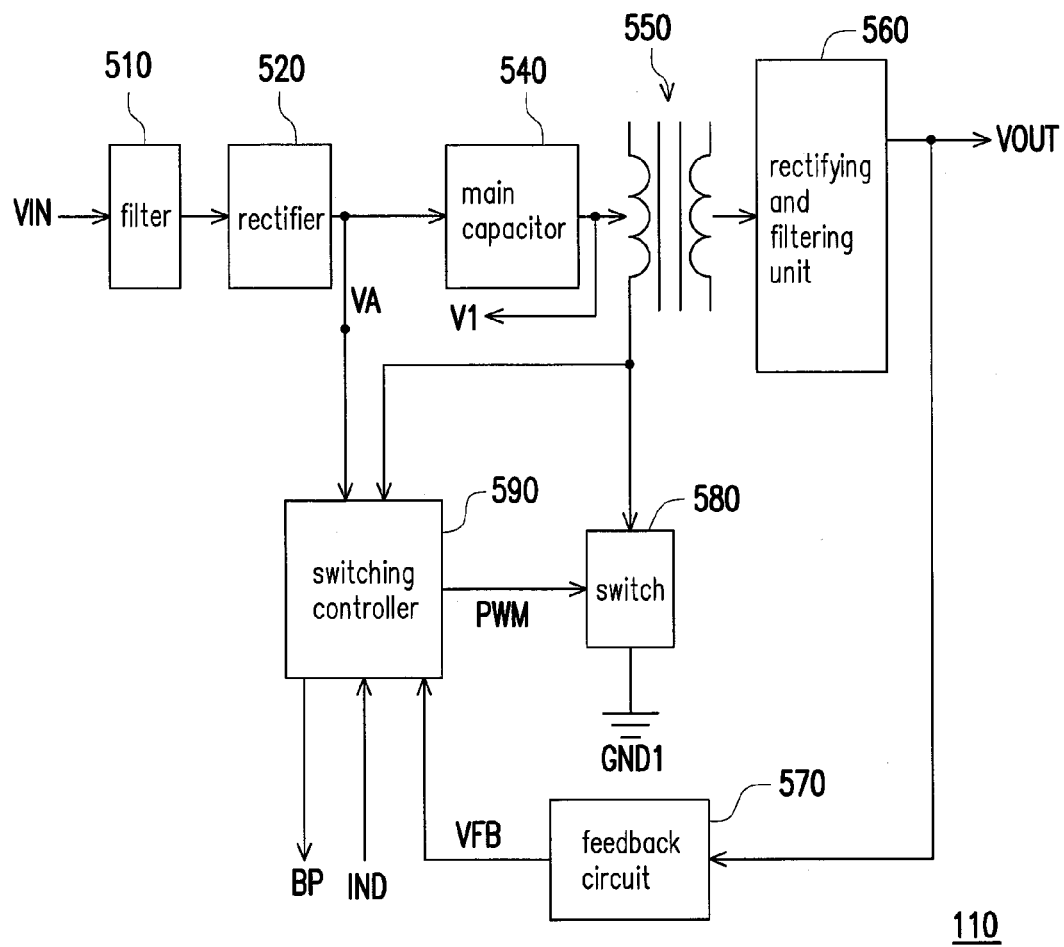
FIG. 5 is a schematic diagram showing a voltage converter in an embodiment.

FIG. 5 is a schematic diagram showing a voltage converter 110 in an embodiment. The voltage converter 110 includes a filter 510, a rectifier 520, a main capacitor 540, a second transformer 550, a rectifying and filtering unit 560, a feedback circuit 570, a switch 580 and a switching controller 590. The filter 510 receives the input voltage VIN, and the rectifier 520 is coupled to an output end of the filter 510 to receive the filtered input voltage VIN. A voltage VA generated by the rectifier 520 is provided to the switching controller 590. The main capacitor 540 is coupled to the rectifier 520.

In the embodiments above, the voltage V1 received by the controller is obtained from a coupling end of the main capacitor 540 and the second transformer 550. The voltage V1 does not need the voltage converter 110 to execute the voltage conversion. That is, when the voltage converter 110 stops converting the voltage, the controller also can operate normally and is not affected.

The primary side of the second transformer 550 is coupled to the main capacitor 540 and one end of the switch 580. The other end of the switch 580 is coupled to the reference ground end GND1 of the primary side. The switch 580 receives the control signal PWM and is on or off accordingly.

The switching controller 590 is coupled to the rectifier 520 and the switch 580. The switching controller 590 receives the voltage VA used as the operation power and provides the control signal PWM to the switch 580 according to the indicating signal IND and the feedback voltage VFB. When the indicating signal IND indicates the voltage converter 110 to convert the voltage, the control signal PWM may be a pulse width modulation signal, and the switch 580 is periodically on and off accordingly. On the contrary, when the indicating signal IND indicates the voltage converter 110 to stop converting the voltage, the voltage level of the control signal PWM may be equal to the voltage of the ground end, and the switch 580 maintains off.

The rectifying and filtering unit 560 is coupled to the secondary side of the second transformer 550, rectifies and filters the voltage of the secondary side of the second transformer 550, and generates the output voltage VOUT. The feedback circuit 570 receives the voltage VOUT and generates a feedback voltage VFB accordingly. The feedback voltage VFB is transmitted to the switching controller 590, and it can make the switching controller 590 generate the control signal PWM.

In sum, when the power adapter is connected to the electronic device, two ends of the secondary side of the first transformer are short to the reference ground end of the secondary side, the voltage of the secondary side of the first transformer is coupled to the voltage of the primary side of the first transformer, and then the power adapter can get whether it is connected to the electronic device accordingly. When the power adapter and the electronic device are not connected, the power adapter stops the voltage conversion of the voltage converter to save power efficiently. When the power adapter does not have a load, the output voltage is not provided, and thus there would be no sparkle affection at a moment of connecting to an electronic device, which ensures security of the user and electronic elements.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:
1. A power adapter, comprising:
a voltage converter receiving an input voltage and determining whether to convert the input voltage to an output voltage according to an indicating signal;
a connecting port connected to an electronic device;
a first transformer including a primary side and a secondary side, wherein the primary side and the secondary side are coupled to each other, and a first end and a second end of the secondary side are coupled to the connecting port, respectively; and a controller coupled to the voltage converter and the first transformer and generating the indicating signal according to a voltage at the primary side of the first transformer, wherein the controller includes:
 a redundant voltage receiving end coupled to the voltage converter to receive a redundant voltage;
 an indicating signal generating end used for transmitting the indicating signal;
 a power supply coupled to the voltage converter and the first transformer and generating a supply power with a variable voltage level according to the input voltage and a power state at a first end and a second end of the primary side of the first transformer, wherein the second end of the primary side of the first transformer is coupled to a first reference ground end; and
 a switch circuit connecting or cutting off the coupling between the redundant voltage receiving end and the indicating signal generating end according to the voltage level of the supply power provided by the power supply;
wherein when the connecting port is electrically connected to the electrical device, a first end and a second end of the secondary side are short to a second reference ground end.

2. The power adapter according to claim 1, wherein when a voltage difference between the first end and the second end of the primary side of the first transformer is smaller than a threshold, the switch circuit cuts off the coupling between the redundant voltage receiving end and the indicating signal generating end.

3. The power adapter according to claim 2, when the voltage difference between the first end and the second end of the primary side of the first transformer equals to or is larger than the threshold, the switch circuit connects the coupling between the redundant voltage receiving end and the indicating signal generating end.

4. The power adapter according to claim 1, wherein the switch circuit includes:
 a first transistor including a first end, a second end and a first control end, wherein the first end of the first transistor is coupled to the first reference ground end, and the first control end of the first transistor is coupled to the first end of the primary side of the first transformer;
 a second transistor including a first end, a second end and a second control end, wherein the second control end of the second transistor is coupled to the second end of the first transistor, and the first end of the second transistor is coupled to the redundant voltage receiving end; and
 a first resistor connected in series between the second end of the second transistor and the indicating signal generating end,
wherein when the first transistor is off, the second transistor is off correspondingly, and when the first transistor is conducted, the second transistor is conducted correspondingly.

5. The power adapter according to claim 4, wherein the switch circuit further includes:
 a second resistor connected in series between the second end of the first transistor and the second control end of the second transistor;
 a third resistor connected in series between the second control end and the first end of the second transistor;
 a fourth resistor connected in series between the first reference ground end and the indicating signal generating end;

a first capacitor connected in series between the first reference ground end and the indicating signal generating end; and
 a second capacitor connected in series between the first reference ground end and the redundant voltage receiving end.

6. The power adapter according to claim 4, wherein the switch circuit further includes:
 a rectifier coupled between the first control end of the first transistor and the first end of the primary side of the first transformer.

7. The power adapter according to claim 6, wherein the rectifier includes:
 at least one diode, wherein an anode of the diode is coupled to the power supply and the first end of the primary side of the first transformer, and a cathode of the diode is coupled to the first control end of the first transistor.

8. The power adapter according to claim 4, wherein the power supply includes:
 a second resistor including a first end and a second end, wherein the first end of the second resistor is coupled to the voltage converter to receive a first voltage generated according to the input voltage;
 a third resistor including a first end and a second end, wherein the first end of the third resistor is coupled to the second end of the second resistor;
 a third transistor including a first end, a second end and a third control end, wherein the first end of the third transistor is coupled to the second end of the second resistor, and the third control end of the third transistor is coupled to the second end of the third resistor;
 a fourth resistor including a first end and a second end, wherein the first end of the fourth resistor is coupled to the second end of the third transistor;
 a first capacitor including a first end and a second end, wherein the first end of the first capacitor is coupled to the second end of the fourth resistor, and the second end of the first capacitor is coupled to the first reference ground end; and
 an alternating current (AC) diode including a first end and a second end, wherein the first end of the AC diode is coupled to the second end of the fourth resistor, and the second end of the AC diode is coupled to the first end of the primary side of the first transformer.

9. The power adapter according to claim 4, wherein the connecting port includes:
 a plug body including a surface;
 a first conducting part disposed at the surface of the plug body, wherein the first conducting part is electrically connected to the first end of the secondary side of the first transformer; and
 a second conducting part disposed at the surface of the plug body, wherein the first conducting part is electrically connected to the second end of the secondary side of the first transformer and the second reference ground end,
wherein the first conducting part is insulated from the second conducting part.

10. The power adapter according to claim 9, wherein the connecting port further includes:
 an insulating part disposed at the surface of the plug body and between the first conducting part and the second conducting part.

11. The power adapter according to claim 1, wherein the voltage converter includes:
 a rectifier receiving the input voltage and rectifying the input voltage to generate a first voltage;

a second transformer coupled to the rectifier to receive the first voltage and generate a second voltage accordingly;
   a switch coupled between the second transformer and the first reference ground end and being on or off according to a control signal;
   a switching controller coupled to the rectifier and the switch, receiving the first voltage as an operation power and sending the control signal to the switch according to the indicating signal and a feedback voltage;
   a rectifying and filtering unit coupled to the second transformer to receive the second voltage and rectifying and filtering the second voltage to generate the output voltage;
   a feedback circuit coupled to the rectifying and filtering unit and the switching controller, generating the feedback voltage according to the output voltage, and sending the feedback voltage to the switching controller; and
   a main capacitor coupled between the rectifier and the second transformer.

12. The power adapter according to claim 11, wherein the switching controller generates the redundant voltage according to the first voltage.

13. The power adapter according to claim 11, wherein the voltage converter further includes:
   a filter coupled to the rectifier to filter the input voltage.

* * * * *